United States Patent
Ogawa et al.

(10) Patent No.: US 8,400,754 B2
(45) Date of Patent: Mar. 19, 2013

(54) METHOD AND APPARATUS FOR PRODUCING A CERAMIC ELECTRONIC COMPONENT

(75) Inventors: Makoto Ogawa, Fukui (JP); Seiichi Matsumoto, Nagaokakyo (JP); Akihiro Motoki, Fukui (JP); Toshiyuki Iwanaga, Sabae (JP); Tatsuo Kunishi, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 365 days.

(21) Appl. No.: 12/631,924

(22) Filed: Dec. 7, 2009

(65) Prior Publication Data

US 2010/0149724 A1    Jun. 17, 2010

(30) Foreign Application Priority Data

Dec. 17, 2008   (JP) .................................. 2008-321145

(51) Int. Cl.
*H01G 4/06* (2006.01)
*H01G 4/228* (2006.01)

(52) U.S. Cl. ............... 361/321.3; 361/321.1; 361/321.2; 361/306.1; 361/309

(58) Field of Classification Search .................. 361/311, 361/321.1–321.3, 306.1, 309; 29/25.35, 29/711, 721, 729
See application file for complete search history.

(56) References Cited

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |

(Continued)

FOREIGN PATENT DOCUMENTS

| | | |
|---|---|---|
| CN | 1590333 A | 3/2005 |
| JP | 63-169014 A | 7/1988 |

(Continued)

OTHER PUBLICATIONS

Official Communication issued in corresponding Chinese Patent Application No. 200910260602.X, mailed on Apr. 6, 2011.

*Primary Examiner* — Eric Thomas
*Assistant Examiner* — Arun Ramaswamy
(74) *Attorney, Agent, or Firm* — Keating & Bennett, LLP

(57) ABSTRACT

A method for producing a laminated ceramic capacitor allows a surface of at least a portion of a ceramic element body chip to be brought into contact with a plated layer formed in advance in a mold member, and performs heat processing on the ceramic element body chip in that contact state, thereby to form an external conductor layer made of the plated layer on the surface of at least the portion of the ceramic element body chip. Thus, a method and an apparatus for producing a ceramic electronic component accurately and precisely controls the thickness of the external conductor layer to be small, and easily controls the length of the external conductor layer.

2 Claims, 12 Drawing Sheets

U.S. PATENT DOCUMENTS

| | | |
|---|---|---|
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2008/0239617 A1* | 10/2008 | Motoki et al. ............. 361/301.4 |

FOREIGN PATENT DOCUMENTS

| | | |
|---|---|---|
| JP | 11-121201 A | 4/1999 |
| JP | 2005-340664 A | 12/2005 |

* cited by examiner

METHOD AND APPARATUS FOR PRODUCING A CERAMIC ELECTRONIC COMPONENT

BACKGROUND OF THE INVENTION

1. Field of the Invention

The present invention generally relates to a method and an apparatus for producing a ceramic electronic component, and more specifically to a method and an apparatus for producing a chip-type ceramic electronic component such as a laminated ceramic capacitor.

2. Description of the Related Art

Conventionally, a laminated ceramic capacitor is produced, for example, in the following manner.

First, a slurry containing a ceramic source material powder is prepared. This slurry is molded into a sheet so as to prepare a ceramic green sheet. On the surface of the ceramic green sheet, an electrically conductive paste serving as a source material of an internal electrode layer is applied according to a predetermined pattern. This conductive paste is composed of a metal powder, a solvent, and a varnish.

Next, a plurality of ceramic green sheets on which the conductive paste has been applied are laminated and thermally pressed to fabricate an integrated crude laminate body. By sintering this crude laminate body, a ceramic laminate body is fabricated. In the inside of this ceramic laminate body, a plurality of internal electrode layers are formed. End surfaces of a portion of the internal electrode layers are exposed to the outside surface of the ceramic laminate body.

Next, an electrically conductive paste serving as a source material of an external electrode layer is applied onto the outside surface of the ceramic laminate body at which the end surfaces of a portion of the internal electrode layers are exposed, followed by firing the ceramic laminate body. This conductive paste is composed of a metal powder, a glass frit, a solvent, and a varnish. By this process, an external electrode layer is formed on the outside surface of the ceramic laminate body so as to be electrically connected to specific internal electrode layers.

Finally, a plated layer is formed on the surface of the external electrode layer in accordance with the needs in order to enhance the soldering performance.

FIG. 12 is a cross-sectional view illustrating a conventional laminated ceramic capacitor.

Referring to FIG. 12, a laminated ceramic capacitor 5 serving as one example of a ceramic electronic component includes a ceramic laminate body 50 having a rectangular parallelepiped shape. One end surface of each of the plurality of internal electrode layers 51 is formed so as to extend up to the outside surface of the ceramic laminate body 50. On both side surfaces of the ceramic laminate body 50, end surfaces of the plurality of internal electrode layers 51 are arranged so as to be alternately exposed. The external electrode layer 52 is formed on both side surfaces of the ceramic laminate body 50 so as to be electrically connected to specific internal electrode layers 51. The wrap-around ends 53 of the external electrode layer 52 are formed to extend to or wrap around to both ends of the upper and lower surfaces of the ceramic laminate body 50.

In the meantime, in recent years, scale reduction and capacitance increase of a laminate ceramic capacitor are demanded. However, according to the above-described production method, the external electrode layer is formed by applying an electrically conductive paste, so that the thickness of the external electrode layer is several tens to several hundreds of μm. For this reason, a thick external electrode layer is an obstacle preventing a larger capacitance with a smaller volume from being obtained in a laminated ceramic capacitor. Therefore, thickness reduction of the external electrode layer serving as an external conductor layer is demanded.

For example, Japanese Patent Application Laid-open (JP-A) No. 63-169014 discloses two methods of a conventional example and an inventive example as a method of forming an external electrode terminal of a chip capacitor.

According to one method disclosed as a conventional example in JP-A No. 63-169014, an activated layer is attached to the whole surface of a chip capacitor element, and an electrically conductive metal layer is deposited on the whole surface of the chip capacitor element by non-electrolytic plating. Then, with use of an etching-resistant layer formed on a portion of the conductive metal layer as a mask, the conductive metal layer is selectively removed by etching, so as to form an external electrode.

According to the other method disclosed as an inventive example in JP-A No. 63-169014, an electrically conductive metal layer is deposited on the whole side wall surfaces at both opposite ends of a chip capacitor element by non-electrolytic plating so that the internal electrode layers exposed to the side wall surfaces will be short-circuited, so as to form an external electrode.

As shown in FIG. 12, in order to perform surface mounting of a laminated ceramic capacitor 5 onto a substrate or the like, the external electrode layer 52 is formed to extend not only to both side surfaces of the ceramic laminate body 50 but also to both ends of the upper and lower surfaces of the ceramic laminate body 50. In this case, the length of the wrap-around ends 53 of the external electrode layer 52 formed on both ends of the upper and lower surfaces of the ceramic laminate body 50 must be controlled to be an almost constant length.

According to the one method of forming an external electrode terminal disclosed in JP-A No. 63-169014, the external electrode is formed by selectively removing the conductive metal layer by etching with the use of a mask. By this forming method, the length of the wrap-around ends 53 of the external electrode layer 52 such as shown in FIG. 12 can be controlled to be an almost constant length. However, this causes a problem in that, for the control, cumbersome production steps of a masking step and an etching step are needed. Also, since such cumbersome production steps must be carried out, it will be extremely difficult to control the length of the wrap-around ends 53 of the external electrode layer 52 to be an almost constant length when the scale of the chip capacitor element is reduced.

Also, according to the other method of forming an external electrode terminal disclosed in JP-A No. 63-169014, non-electrolytic plating is carried out by using an internal electrode layer exposed to the side wall surfaces at both ends of the chip capacitor element, so that the external electrode layer 52 can be formed on both side surfaces of the ceramic laminate body 50 as shown in FIG. 12. However, it is not possible to form the wrap-around ends 53 of the external electrode layer 52 so as to extend to both ends of the upper and lower surfaces of the ceramic laminate body 50. In order to form the wrap-around ends 53 of the external electrode layer 52 so as to extend to both ends of the upper and lower surfaces of the ceramic laminate body 50, an activated layer must be formed in a region in which the wrap-around ends 53 are to be formed. In this case, a problem is caused such that cumbersome production steps of a masking step and an etching step are needed for selectively forming an activated layer for the purpose of controlling the length of the wrap-around ends 53 of the external electrode layer 52 such as shown in FIG. 12 to be an almost constant length. Also, since such cumbersome production steps must be carried out, it will be extremely difficult to control the length of the wrap-around ends 53 of the external electrode layer 52 to be an almost constant length when the scale of the chip capacitor element is reduced.

SUMMARY OF THE INVENTION

Preferred embodiments of the present invention provide a method and an apparatus for producing a ceramic electronic component that can control the thickness of the external conductor layer to be small, and can easily control the length of the external conductor layer.

A method for producing a ceramic electronic component according to a preferred embodiment of the present invention is a method for producing a ceramic electronic component including a ceramic element body and includes a step of allowing a surface of at least a portion of the ceramic element body to be brought into contact with a plated layer formed in advance on a member different from the ceramic element body, and a step of performing heat processing on the ceramic element body in a state in which the surface of at least the portion of the ceramic element body is in contact with the plated layer, thereby to form an external conductor layer made of the plated layer on the surface of the portion of the ceramic element body.

By the method of producing a ceramic electronic component according to a preferred embodiment of the present invention, a plated layer is formed in advance on a member different from the ceramic element body, so that the dimensions such as the thickness and the length of the plated layer are defined in advance. For this reason, by performing heat processing on the ceramic element body in a state in which the surface of at least the portion of the ceramic element body is in contact with the plated layer, the variation in the dimensions such as the thickness and the length of the external conductor layer made of the plated layer formed on the surface of the portion of the ceramic element body is small among the plurality of ceramic electronic components, so that the thickness and the length of the external conductor layer can be easily controlled. Also, since the external conductor layer is made of a plated layer, the thickness of the external conductor layer can be reduced. Further, since the external conductor layer is formed by transcription of the plated layer formed in advance on a member different from the ceramic element body onto the surface of the portion of the ceramic element body, defects are prevented from being generated in the external conductor layer even when the thickness of the plated layer is reduced.

Here, by the method of producing a ceramic electronic component according to a preferred embodiment of the present invention, there is no need to immerse the ceramic element body into a plating solution in order to form an external conductor layer made of a plated layer on the surface of the portion of the ceramic element body, so that it is possible to prevent a decrease in the reliability caused by penetration of the plating solution into the ceramic element body.

A method for producing a ceramic electronic component according to another preferred embodiment of the present invention is a method for producing a ceramic electronic component including a ceramic element body and includes the steps of a step of forming a plated layer on an inside surface of a recess of a mold member into which a portion of the ceramic element body can be inserted and fitted, a step of allowing a surface of the portion of the ceramic element body to be brought into contact with the plated layer formed on the inside surface of the recess of the mold member by inserting and fitting the portion of the ceramic element body into the recess of the mold member, a step of performing heat processing on the ceramic element body in a state in which the surface of the portion of the ceramic element body is in contact with the plated layer, thereby to form an external conductor layer made of the plated layer on the surface of the portion of the ceramic element body, and a step of separating the ceramic element body, on which the external conductor layer is formed, from the mold member.

By the method of producing a ceramic electronic component according to another preferred embodiment of the present invention, the following functions and effects can be produced in addition to the functions and effects produced by the production method according to above preferred embodiment of the present invention.

By the method of producing a ceramic electronic component according to another preferred embodiment of the present invention, the surface of the portion of the ceramic element body is allowed to be brought into contact with the plated layer formed on the inside surface of the recess of the mold member by inserting and fitting the portion of the ceramic element body into the recess of the mold member. By performing heat processing on the ceramic element body in a state in which the surface of the portion of the ceramic element body is in contact with the plated layer formed on the inside surface of the recess of the mold member, an external conductor layer made of the plated layer is formed on the surface of the portion of the ceramic element body. For this reason, the external conductor layer can be formed on both side surfaces of the ceramic element body simply by using a mold member having a recess on which a plated layer is formed in advance, without using the cumbersome production steps of the masking step and the etching step. In addition, both ends of the external conductor layer can be easily formed to extend up to both ends of the upper and lower surfaces of the ceramic element body.

Here, by using a mold member having a recess, the plated layer formed in advance can be easily brought into contact with the surface of the portion of the ceramic element body.

In the method for producing a ceramic electronic component according to another preferred embodiment of the present invention, preferably, the step of forming the plated layer on the inside surface of the recess of the mold member is carried out preferably by electrolytic plating, a portion of the mold member on which the plated layer is to be formed is made of a conductor, and a portion of the mold member on which the plated layer is not to be formed is made of an insulator.

In this case, the plated layer can be easily formed selectively on only the conductor portion preferably by electrolytic plating on the inside surface of the recess of the mold member. Also, the plated layer can be selectively formed or the plated layer can be patterned without using cumbersome steps of the masking step and the etching step. This makes it possible for the production method according to a preferred embodiment of the present invention to be applied even to a case of producing a ceramic electronic component having numerous terminals in which a plurality of external electrodes serving as external conductor layers are formed on the outer surface of the ceramic element body.

Here, the portion on which the plated layer is formed may be the whole or a portion of the inside surface of the recess of the mold member.

In the method for producing a ceramic electronic component according to another preferred embodiment of the present invention, preferably, the step of forming the plated layer on the inside surface of the recess of the mold member is preferably carried out by non-electrolytic plating, a portion of the mold member on which the plated layer is to be formed is made of a material that has a catalytic activity with respect to a reducing agent contained in a non-electrolytic plating bath, and a portion of the mold member on which the plated layer is not to be formed is made of a material that does not have a catalytic activity with respect to the reducing agent contained in the non-electrolytic plating bath.

In this case, the plated layer can be easily formed selectively on only the portion made of the material having a catalytic activity preferably by non-electrolytic plating on the inside surface of the recess of the mold member. Also, the plated layer can be selectively formed or the plated layer can be patterned without using the cumbersome steps of the masking step and the etching step. This makes it possible for the production method according to a preferred embodiment of the present invention to be applied even to a case of producing a ceramic electronic component having numerous terminals in which a plurality of external electrodes serving as external conductor layers are formed on the outer surface of the ceramic element body.

Here, the portion on which the plated layer is formed may be the whole inside surface or a portion of the inside surface of the recess of the mold member.

In the method for producing a ceramic electronic component according to various preferred embodiments of the present invention, preferably, the heat processing on the ceramic element body is carried out at a temperature higher than a temperature at which a metal contained in the plated layer reacts with oxygen contained in the ceramic element body to yield a product.

In this case, by the presence of the product, firm close adhesion of the plated layer and the ceramic element body with each other can be achieved. By this process, the close adhesion property of the external conductor layer made of the plated layer to the ceramic element body can be enhanced.

In the method for producing a ceramic electronic component according to various preferred embodiments of the present invention, preferably, the ceramic element body includes a plurality of laminated ceramic layers and a plurality of internal conductor layers disposed between the plurality of ceramic layers, and a surface of a portion of the internal conductor layers is exposed to an outside surface of the ceramic element body. Then, preferably, the external conductor layer is formed to be electrically connected to the internal conductor layers in the step of forming the external conductor layer made of the plated layer on the surface of the portion of the ceramic element body.

In this case, the production method according to a preferred embodiment of the present invention can be applied, for example, to production of a laminated ceramic capacitor of a chip type, so that a larger capacitance can be obtained with a smaller volume in a laminated ceramic capacitor.

A method for producing a ceramic electronic component according to another preferred embodiment of the present invention is a method for producing a ceramic electronic component having a ceramic element body, wherein the above-mentioned steps are successively carried out.

By doing so, a method of forming an external conductor layer being excellent in mass productivity can be provided in a method of producing a ceramic electronic component.

In the method for producing a ceramic electronic component according to another preferred embodiment of the present invention, preferably, a plated layer is formed on an inside surface of a recess of a first mold member, and a plated layer is formed on an inside surface of a recess of a second mold member in the step of forming the plated layer on the inside surface of the recess of the mold member. Then, preferably, a surface of a portion on one side of the ceramic element body is allowed to be brought into contact with the plated layer formed on the inside surface of the recess of the first mold member by inserting and fitting the portion on the one side of the ceramic element body into the recess of the first mold member, and a surface of a portion on the other side opposite to the one side of the ceramic element body is allowed to be brought into contact with the plated layer formed on the inside surface of the recess of the second mold member by inserting and fitting the portion on the other side of the ceramic element body into the recess of the second mold member in the step of allowing the surface of the portion of the ceramic element body to be brought into contact with the plated layer formed on the inside surface of the recess of the mold member.

By doing so, a method of forming an external conductor layer being even more excellent in mass productivity can be provided in a method of producing a ceramic electronic component.

In the method for producing a ceramic electronic component, preferably, a major component of the plated layer is nickel (Ni) or copper (Cu), for example.

An apparatus for producing a ceramic electronic component according to a preferred embodiment of the present invention is an apparatus for producing a ceramic electronic component including a ceramic element body, the apparatus including a first station arranged to form a plated layer on an inside surface of a recess of a mold member into which a portion of the ceramic element body can be inserted and fitted, a second station arranged to allow a surface of the portion of the ceramic element body to be brought into contact with the plated layer formed on the inside surface of the recess of the mold member by inserting and fitting the portion of the ceramic element body into the recess of the mold member, a third station arranged to perform heat processing on the ceramic element body in a state in which the surface of the portion of the ceramic element body is in contact with the plated layer, thereby to form an external conductor layer made of the plated layer on the surface of the portion of the ceramic element body, and a fourth station arranged to separate the ceramic element body, on which the external conductor layer is formed, from the mold member.

By doing so, an apparatus for forming an external conductor layer being excellent in mass productivity can be provided in an apparatus for producing a ceramic electronic component.

In the apparatus for producing a ceramic electronic component according to a preferred embodiment of the present invention, preferably, the first station arranged to form the plated layer on the inside surface of the recess of the mold member includes a station arranged to form a plated layer on an inside surface of a recess of a first mold member, and a station arranged to form a plated layer on an inside surface of a recess of a second mold member. Then, preferably, the second station arranged to allow the surface of the portion of the ceramic element body to be brought into contact with the plated layer formed on the inside surface of the recess of the mold member includes a station arranged to allow a surface of a portion on one side of the ceramic element body to be brought into contact with the plated layer formed on the inside surface of the recess of the first mold member by inserting and fitting the portion on the one side of the ceramic element body into the recess of the first mold member, and a station arranged to allow a surface of a portion on the other side opposite to the one side of the ceramic element body to be brought into contact with the plated layer formed on the inside surface of the recess of the second mold member by inserting and fitting the portion on the other side of the ceramic element body into the recess of the second mold member.

By doing so, an apparatus for forming an external conductor layer being even more excellent in mass productivity can be provided in an apparatus for producing a ceramic electronic component.

A plurality of ceramic electronic components produced by using the production method according to a preferred embodiment of the present invention are a plurality of ceramic electronic components in which a plated layer is formed on a surface of a portion of each of a plurality of ceramic element bodies, including a plurality of ceramic element bodies and a plurality of plated layers. The plurality of ceramic element bodies have upper and lower surfaces and left and right side surfaces connecting the upper and lower surfaces. The plurality of plated layers are constructed in such a manner that each of the plated layers is arranged to extend from one end of the upper surface of each of the plurality of ceramic element bodies to one end of the lower surface by passing through at least one of the left side surface and the right side surface. The ratio of the standard deviation relative to an average value of the lengths of the plurality of plated layers disposed on one end of either of the upper surface and the lower surface of each of the plurality of ceramic element bodies is about 3% or less.

In this manner, in a ceramic electronic component produced by the production method according to a preferred embodiment of the present invention, the length of both ends of the plated layer constituting the external conductor layer can be accurately and precisely controlled.

In the plurality of ceramic electronic components produced by the production method according to a preferred embodiment of the present invention, preferably, a ratio of a standard deviation relative to an average value of thicknesses of the plurality of plated layers is about 5% or less.

By doing so, also the thickness of the plated layer constituting the external conductor layer can be accurately and precisely controlled.

As described above, according to various preferred embodiments of the present invention, the thickness of the external conductor layer can be controlled to be small, and the length of the external conductor layer can be easily controlled. This makes it possible for scale reduction and capacitance increase of a ceramic electronic component such as a laminated ceramic capacitor of a chip type, for example, to be easily realized.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereafter, preferred embodiments of the present invention will be described with reference to the attached drawings.

FIGS. 1 to 9 are schematic cross-sectional views sequentially illustrating the steps of producing a laminated ceramic capacitor which is one example of a ceramic electronic component according to various preferred embodiments of the present invention.

With reference to FIGS. 1 to 9, a method of forming an external conductor layer made of an electrolytically plated layer in a laminated ceramic capacitor will be described.

Figure 1:
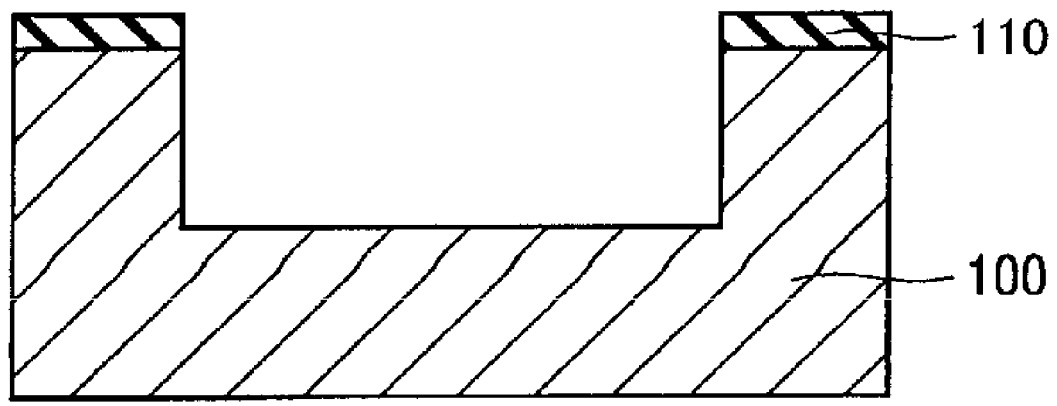
FIG. 1 is a schematic cross-sectional view illustrating the first step of producing a laminated ceramic capacitor which is one example of a ceramic electronic component according to a preferred embodiment of the present invention.

First, as shown in FIG. 1, a ceramic layer 110 is formed on the portion of the surface of a mold member 100 where the plated layer is not to be formed. The portion where the plated layer is to be formed is left to be made of the material of the mold member 100, for example, stainless steel. The portion where the plated layer is not to be formed may be left to be made of stainless steel which is the material of the mold member 100. However, in this case, by repetitively using the mold member 100, unnecessary electrolytically plated layers will be deposited on that portion, so that it is not preferable. The ceramic layer 110 is one example of an insulator and is made, for example, of a ceramic material such as alumina or zirconia. Stainless steel serving as a material of the mold member 100 is just one example of a conductor, and the mold member 100 may be made of another metal material. However, it is necessary that the metal material serving as a material of the mold member 100 have a melting point higher than the heat processing temperature of a later step. Here, the mold member 100 has a recess into which a portion of a ceramic element body chip preferably having a substantially rectangular parallelepiped shape, for example, mentioned later can be inserted and fitted.

Figure 2:
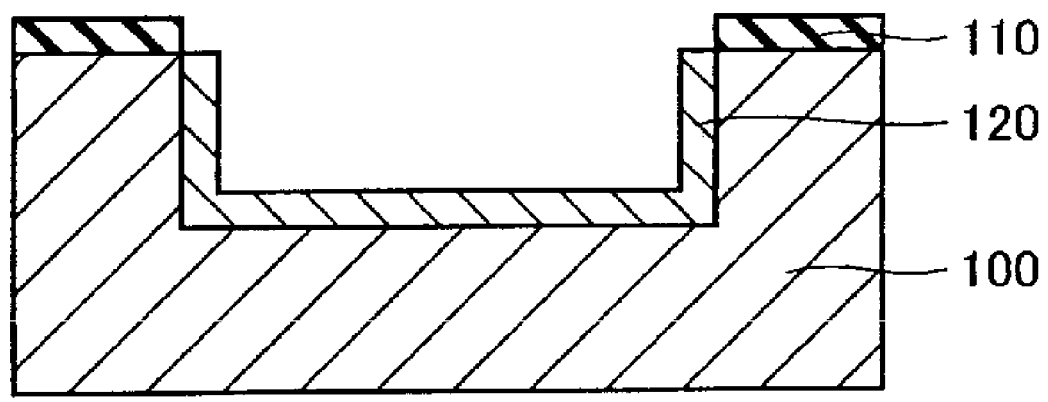
FIG. 2 is a schematic cross-sectional view illustrating the second step of producing a laminated ceramic capacitor which is one example of a ceramic electronic component according to a preferred embodiment of the present invention.

Next, as shown in FIG. 2, by the electrolytic plating method, a plated layer 120, for example, a copper plated layer, is formed on an inside surface of the recess of the mold member 100. The plated layer 120 may be a nickel plated layer, for example.

Figure 3:
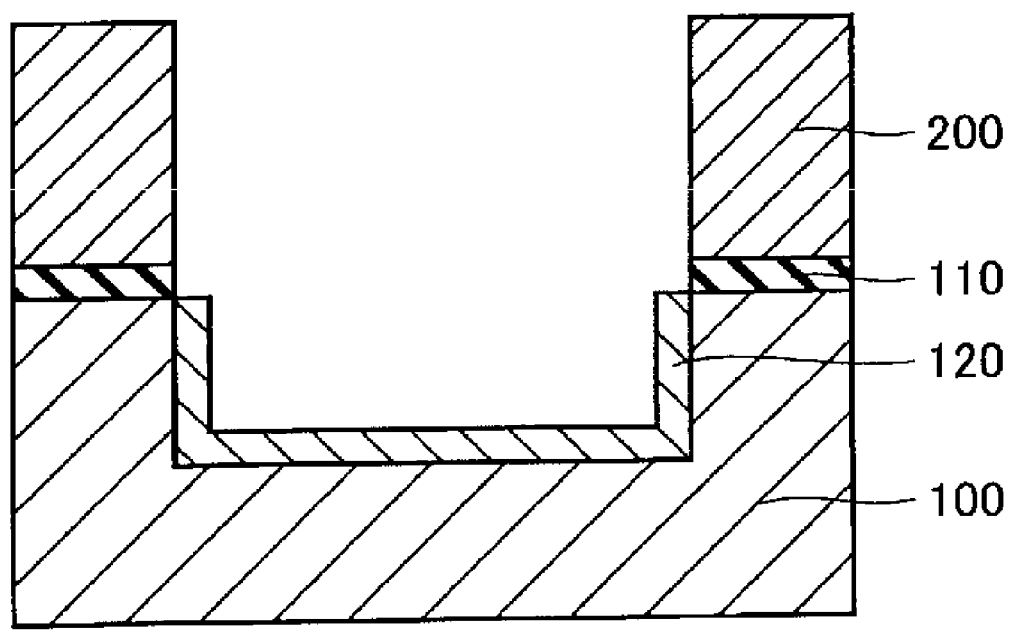
FIG. 3 is a schematic cross-sectional view illustrating the third step of producing a laminated ceramic capacitor which is one example of a ceramic electronic component according to a preferred embodiment of the present invention.

Thereafter, as shown in FIG. 3, a chip guiding supporting jig 200 having a ring shape is mounted on the ceramic layer 110 so as to surround the recess.

Figure 4:
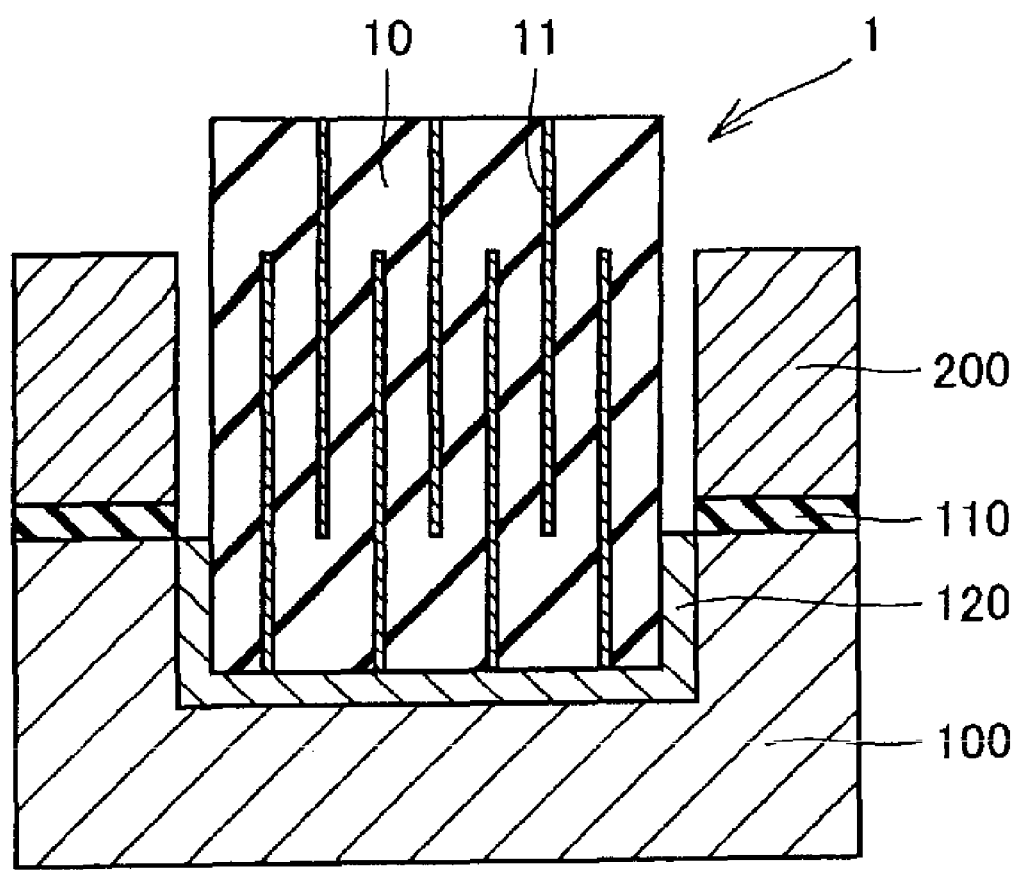
FIG. 4 is a schematic cross-sectional view illustrating the fourth step of producing a laminated ceramic capacitor which is one example of a ceramic electronic component according to a preferred embodiment of the present invention.

Then, as shown in FIG. 4, one side portion of a ceramic element body chip 1 of a laminated ceramic capacitor is guided by the inner circumferential surface of the chip guiding supporting jig 200 so as to insert and fit a portion of the ceramic element body chip 1 into the recess of the mold member 100. As a result, the surface of the portion of the ceramic element body chip 1, that is, the surface on which an external conductor layer is to be formed, can be brought into contact with the plated layer 120 formed on the inside surface of the recess of the mold member 100. Also, the ceramic element body chip 1, a portion of which is inserted and fitted into the recess of the mold member 100, is supported by the chip guiding supporting jig 200 and will not fall down or be dropped.

Here, the ceramic element body chip 1 of the laminated ceramic capacitor serving as one example of a ceramic electronic component includes a ceramic laminate body 10 having a substantially rectangular parallelepiped shape, for example. One end surface of each of the plurality of internal conductor layers 11 is formed to extend up to the outside surface of the ceramic laminate body 10. On both side surfaces of the ceramic laminate body 10, end surfaces of the plurality of internal conductor layers 11 are arranged so as to be alternately exposed.

Figure 5:
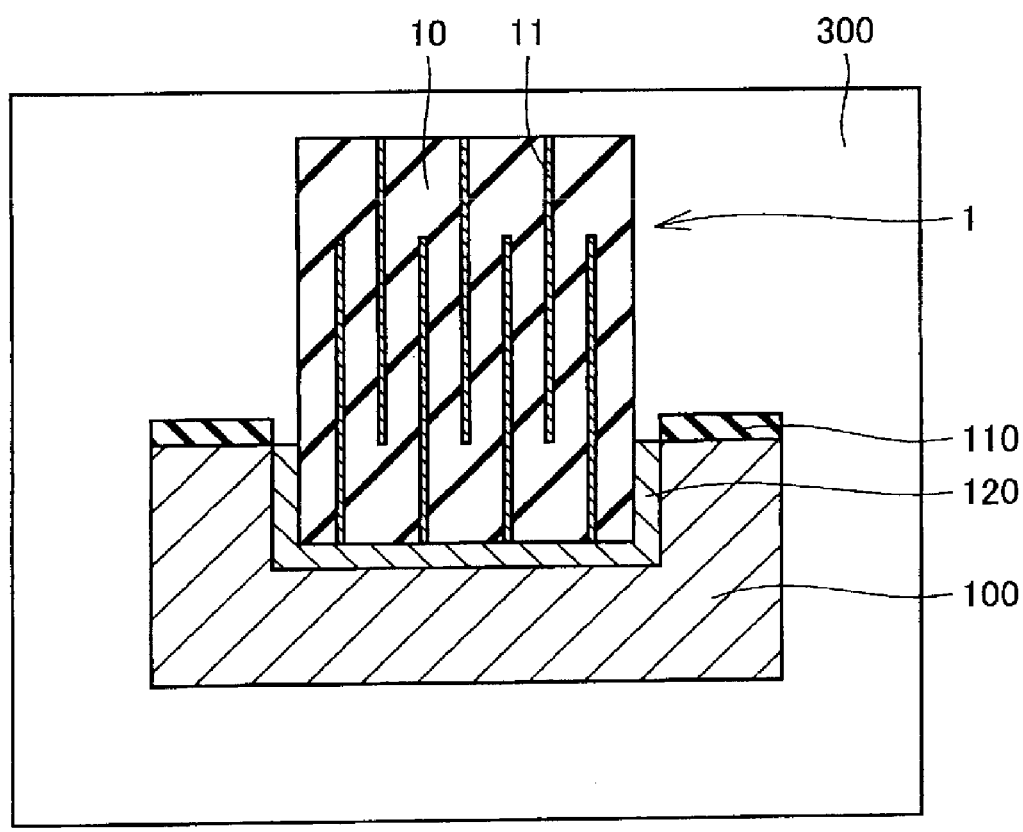
FIG. 5 is a schematic cross-sectional view illustrating the fifth step of producing a laminated ceramic capacitor which is one example of a ceramic electronic component according to a preferred embodiment of the present invention.

As shown in FIG. 5, after the chip guiding supporting jig 200 is removed from the mold member 100, the mold member 100 and the ceramic element body chip 1 are put into a heat processing furnace 300 to perform heat processing in a state in which the surface of the ceramic element body chip 1 is in contact with the plated layer 120. This heat processing is carried out preferably at a temperature higher than the temperature at which the metal contained in the plated layer 120 and the oxygen contained in the ceramic element body chip 1 react with each other to yield a product. For example, when the metal contained in the plated layer 120 is copper, the heat processing is carried out at a temperature higher than or equal to about 1065° C., whereby $Cu_2O$ and $CuO$ which are oxide of copper are produced as the aforesaid product in the vicinity of the interface between the plated layer 120 and the ceramic element body chip 1.

Figure 8:
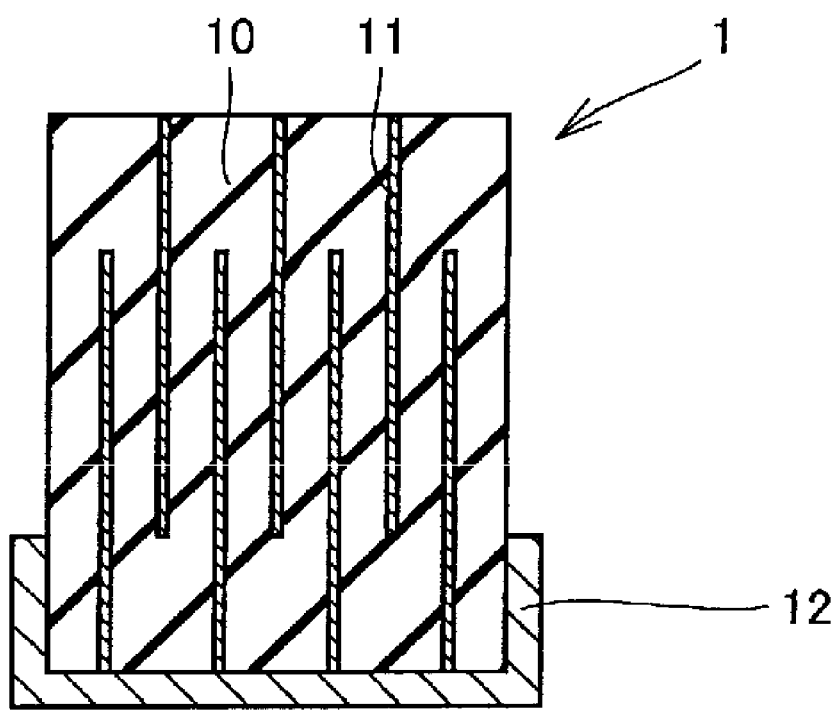
FIG. 8 is a schematic cross-sectional view illustrating the sixth step of producing a laminated ceramic capacitor which is one example of a ceramic electronic component according to a preferred embodiment of the present invention.
Figure 8:
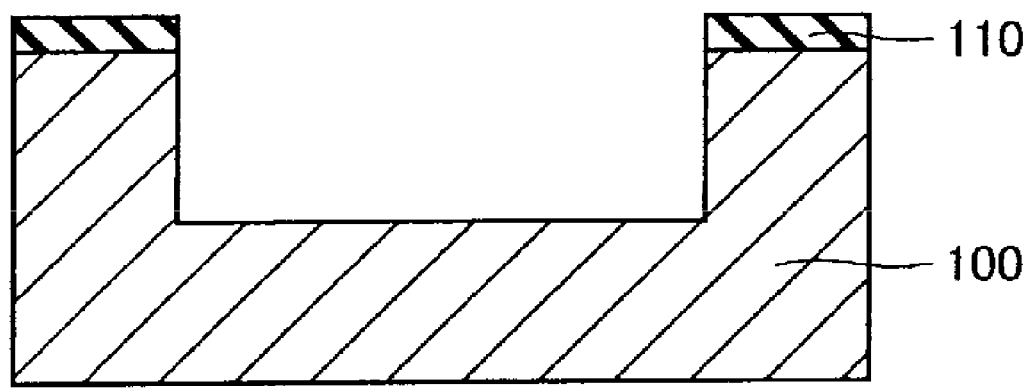

In this manner, by performing heat processing on the ceramic element body chip 1 in a state in which the surface of the ceramic element body chip 1 is in contact with the plated layer 120, an external conductor layer 12 made of the plated layer is formed on the surface of one side of the ceramic element body chip 1 as shown in FIG. 8. By the presence of the aforesaid product, the plated layer 120 and the ceramic element body chip 1 can be firmly allowed to adhere closely to each other. Then, after cooling, the ceramic element body chip 1 on which the external conductor layer 12 has been formed is separated from the mold member 100.

Figure 6:
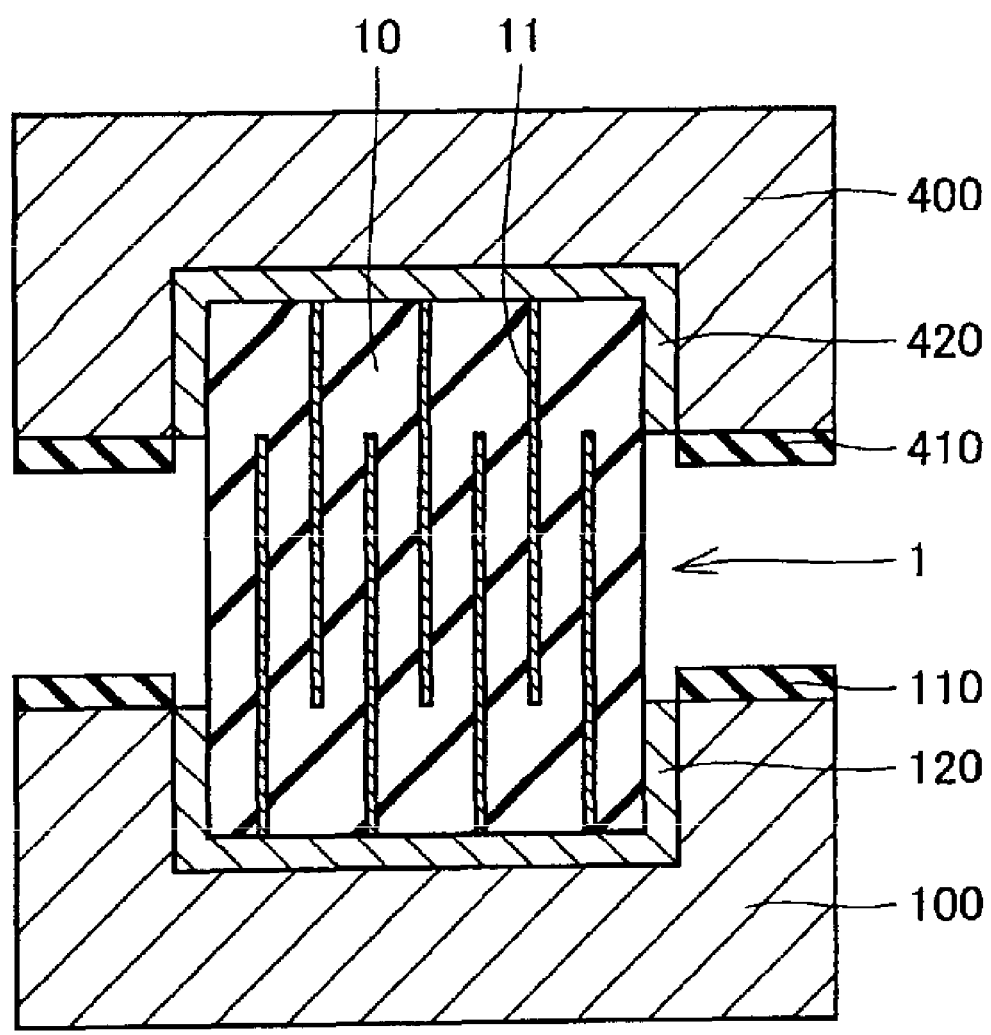
FIG. 6 is a schematic cross-sectional view illustrating a modified example of the fourth step of producing a laminated ceramic capacitor which is one example of a ceramic electronic component according to a preferred embodiment of the present invention.

In the above-described preferred embodiment, an example has been described in which an external conductor layer 12 made of a plated layer is formed on the surface of one side of the ceramic element body chip 1. In a case in which an external conductor layer 12 made of a plated layer is formed on the surface of both sides of the ceramic element body chip 1, first, as shown in FIG. 6, the chip guiding supporting jig 200 is removed from the mold member 100. Another mold member 400 is prepared, and a ceramic layer 410 is formed on the portion of the surface of the mold member 400 where the plated layer is not to be formed. By the electrolytic plating method, a plated layer 420, for example, a copper plated layer, is formed on an inside surface of the recess of the mold member 400. Another side portion on the opposite side of the ceramic element body chip 1 of the laminated ceramic capacitor is inserted and fitted into the recess of the other mold member 400. As a result, the surface of the other side portion as the surface of one portion of the ceramic element body chip 1 can be brought into contact with the plated layer 420 formed on the inside surface of the recess of the mold member 400. In this manner, the surface of both sides of the ceramic element body chip 1 on which the external conductor layer is to be formed can be brought into contact.

Figure 7:
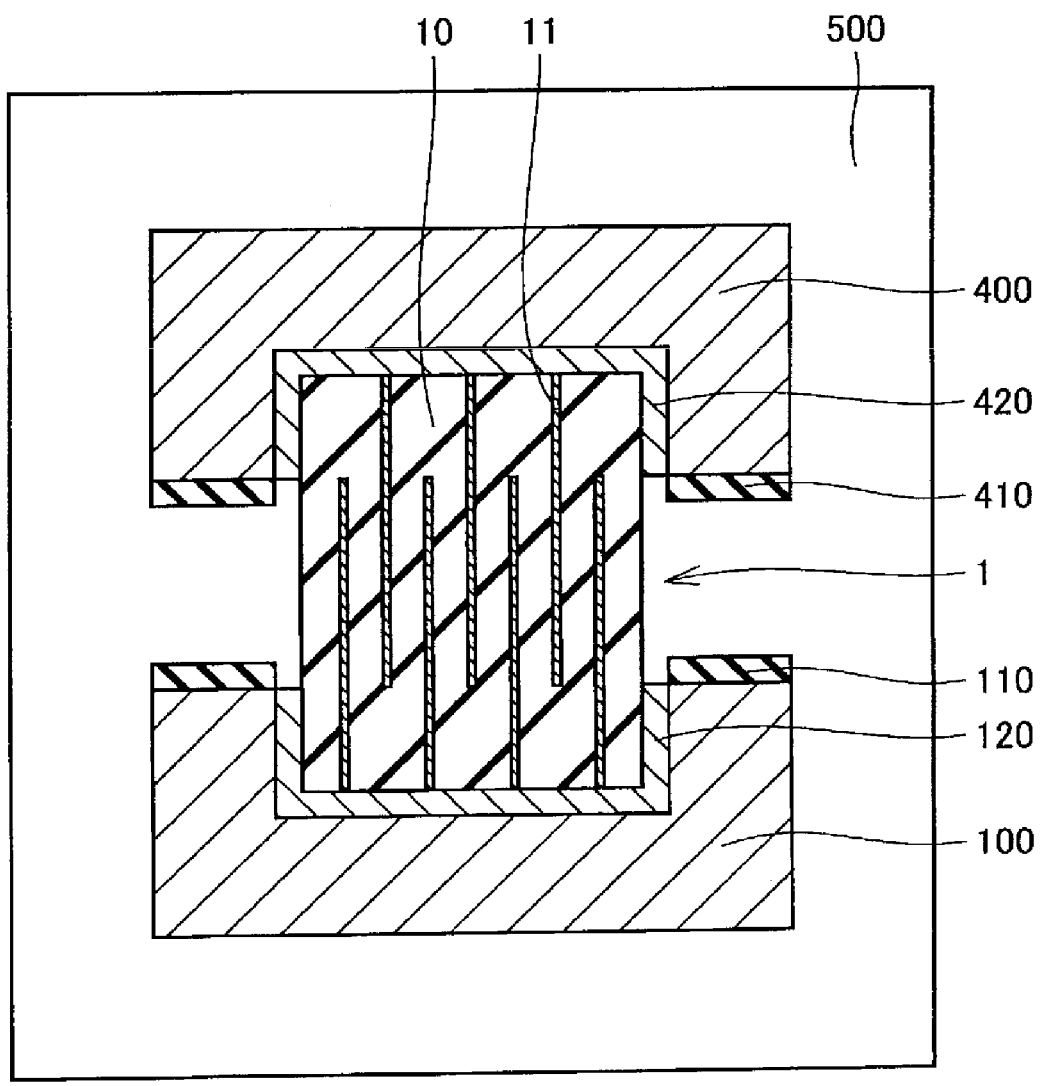
FIG. 7 is a schematic cross-sectional view illustrating a modified example of the fifth step of producing a laminated ceramic capacitor which is one example of a ceramic electronic component according to a preferred embodiment of the present invention.
Figure 9:
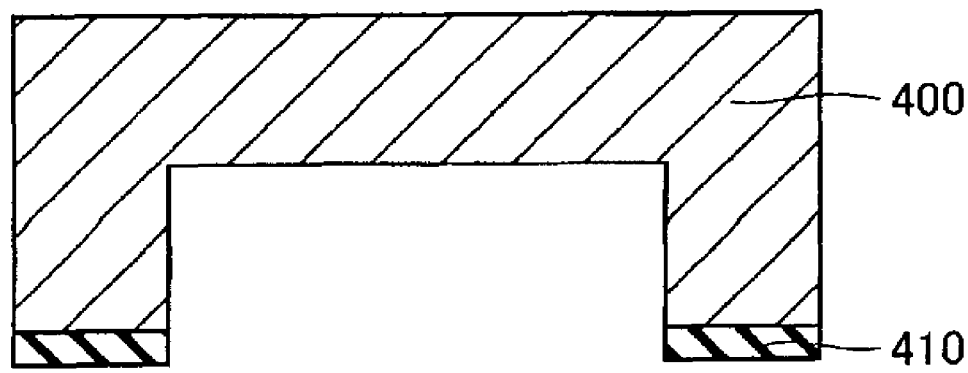
FIG. 9 is a schematic cross-sectional view illustrating the seventh step of producing a laminated ceramic capacitor which is one example of a ceramic electronic component according to a preferred embodiment of the present invention.
Figure 9:
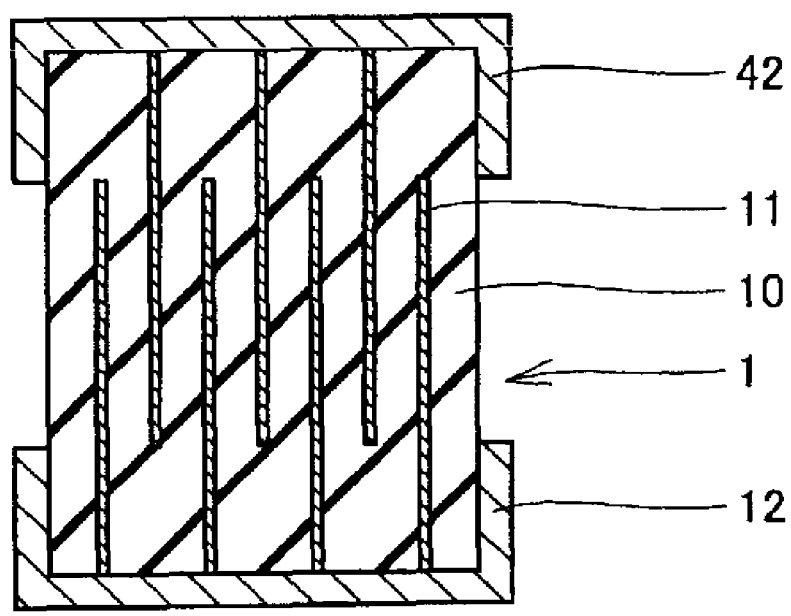
Figure 9:
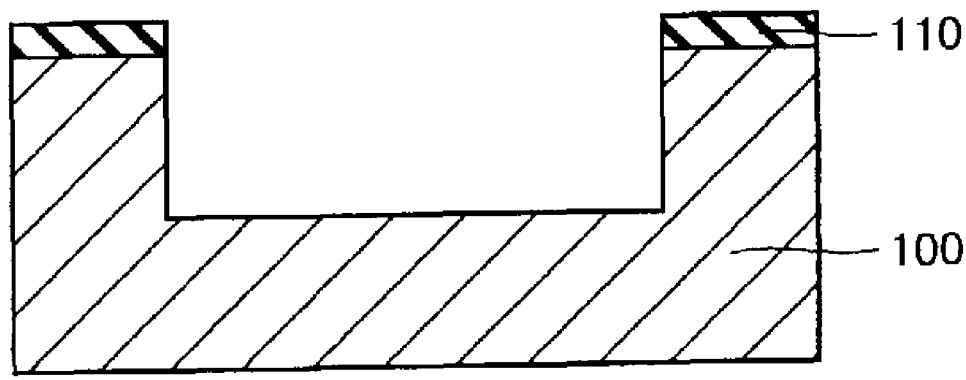

Then, as shown in FIG. 7, the mold member 100 and the ceramic element body chip 1 are put into a heat processing furnace 500 to perform heat processing in a state in which the surface of both sides of the ceramic element body chip 1 is in contact with the plated layers 120, 420. In this manner, by performing heat processing on the ceramic element body chip 1 in a state in which the surfaces of both sides of the ceramic element body chip 1 are in contact with the plated layers 120, 420, external conductor layers 12, 42 made of the plated layer are formed on the surfaces of both sides of the ceramic element body chip 1 as shown in FIG. 9. Then, after cooling, the ceramic element body chip 1 on which the external conductor layers 12, 42 have been formed is separated from the mold members 100, 400.

Here, in the case of forming an external conductor layer made of a non-electrolytically plated layer in a laminated ceramic capacitor, a ceramic layer 110 may be formed on the portion of the surface of the mold member 100 where the plated layer is not to be formed, as shown in FIG. 1. However, the portion where the plated layer is not to be formed may be left to be made of the material of the mold member 100, for example, stainless steel, which is one example of a material that does not have a catalytic activity with respect to formaldehyde which is one example of a reducing agent contained in a non-electrolytic plating bath. To the portion where the plated layer is to be formed, a material containing, for example, palladium (Pd) particles, which are a catalyst substance in the case of copper plating, is imparted as a material that has a catalytic activity with respect to the reducing agent contained in the non-electrolytic plating bath. Next, as shown in FIG. 2, by the non-electrolytic plating method, a plated layer 120, for example, a copper plated layer, is formed on the inside surface of the recess of the mold member 100. The subsequent production steps are the same as in the case of forming an external conductor layer made of an electrolytically plated layer.

As described above, as one preferred embodiment of the present invention, in the method of producing a laminated ceramic capacitor, the plated layers 120, 420 are formed in advance on members different from the ceramic element body chip 1, so that the dimensions such as the thickness and the length of the plated layers 120, 420 are defined in advance. For this reason, by performing heat processing on the ceramic element body chip 1 in a state in which the surface of at least a portion of the ceramic element body chip 1 is in contact with the plated layers 120, 420, the variations in the dimensions such as the thickness and the length of the external conductor layers 12, 42 made of the plated layers formed on the surface of the portion of the ceramic element body chip 1 are small among the plurality of laminated ceramic capacitors, so that the thickness and the length of the external conductor layers 12, 42 can be easily controlled. Also, since the external conductor layers 12, 42 are made of a plated layer, the thickness of the external conductor layers 12, 42 can be reduced. Further, since the external conductor layers 12, 42 are formed by transcription of the plated layers 120, 420 formed in advance on the members different from the ceramic element body chip 1 onto the surface of the portion of the ceramic element body chip 1, defects are hardly generated in the external conductor layers 12, 42 even when the thickness of the plated layers 120, 420 is reduced.

Here, in the method of producing a laminated ceramic capacitor according to a preferred embodiment of the present invention, the external conductor layers 12, 42 made of a plated layer are formed on the surface of a portion of the ceramic element body chip 1, so that there is no need to immerse the ceramic element body chip 1 into a plating solution, whereby the decrease in the reliability caused by penetration of the plating solution into the ceramic element body chip 1 can be prevented.

When the method of producing a laminated ceramic capacitor according to a preferred embodiment of the present invention described above is viewed from another aspect, the following functions and effects can be produced in addition to the above-described functions and effects.

Figure 10:
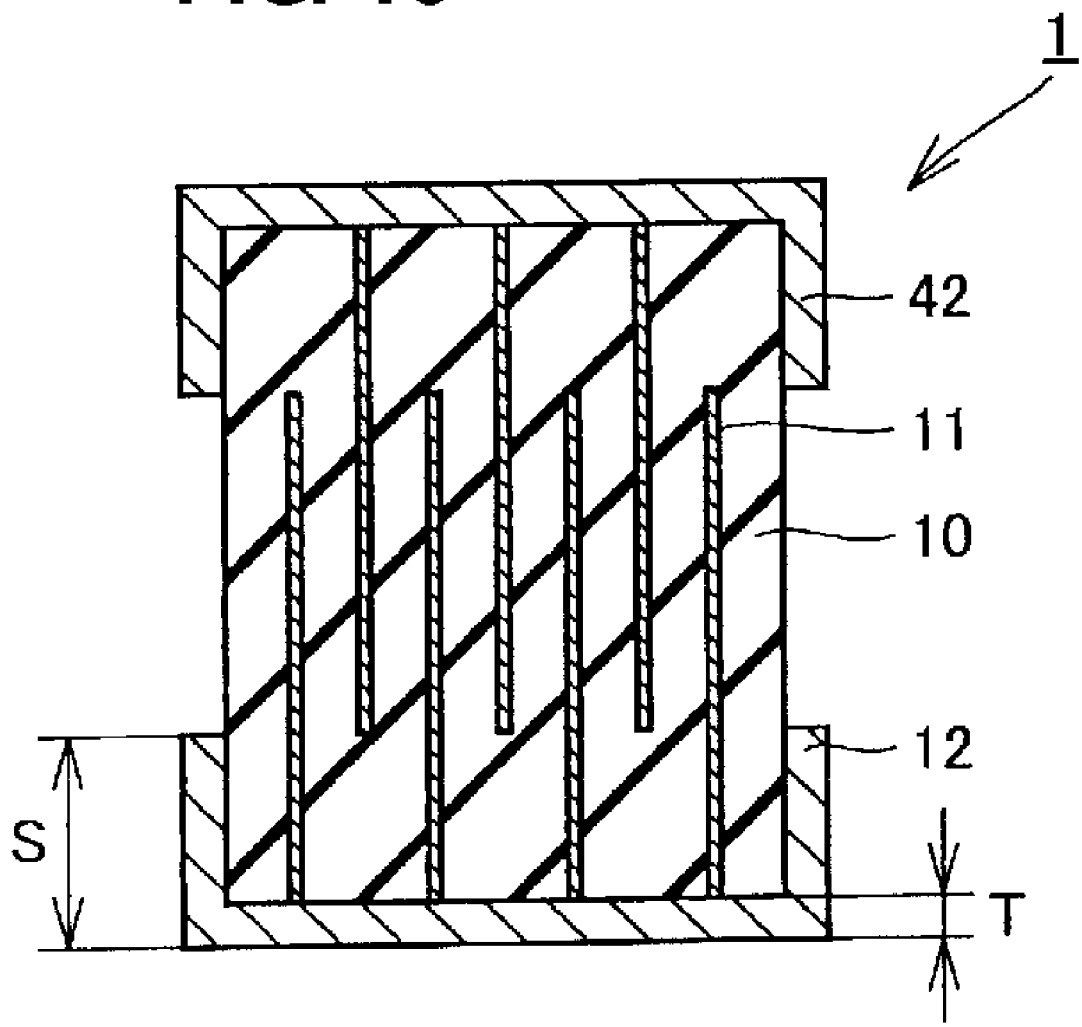
FIG. 10 is a cross-sectional view illustrating a laminated ceramic capacitor obtained by the production method according to a preferred embodiment of the present invention.

The surface of a portion of the ceramic element body chip 1 is allowed to be brought into contact with the plated layers 120, 420 formed on the inside surface of the recess of the mold members 100, 400 by inserting and fitting the portion of the ceramic element body chip 1 into the recess of the mold members 100, 400. By performing heat processing on the ceramic element body chip 1 in a state in which the surface of the portion of the ceramic element body chip 1 is in contact with the plated layers 120, 420 formed on the inside surface of the recess of the mold members 100, 400, external conductor layers 12, 42 made of the plated layer are formed on the surface of the portion of the ceramic element body chip 1. For this reason, the external conductor layers 12, 42 can be formed on both side surfaces of the ceramic element body chip 1, as shown in FIG. 10, simply by using mold members 100, 400 having a recess on which plated layers 120, 420 are formed in advance, without using cumbersome production steps of the masking step and the etching step. In addition, wrap-around ends of the external conductor layers 12, 42 can be easily formed to extend up to both ends of the upper and lower surfaces of the ceramic element body chip 1.

Here, by using mold members 100, 400 having a recess, the plated layers 120, 420 formed in advance can be easily brought into contact with the surface of the portion of the ceramic element body chip 1.

In the method of producing a laminated ceramic capacitor according to a preferred embodiment of the present invention, when the step of forming the plated layers 120, 420 on the inside surface of the recess of the mold members 100, 400 is carried out by electrolytic plating, and the portion of the mold members 100, 400 on which the plated layers 120, 420 are to be formed is made of a conductor, and the portion of the mold members 100, 400 on which the plated layers are not to be formed is made of an insulator, the plated layers 120, 420 can be easily formed selectively on only the portion of the conductor in the inside surface of the recess of the mold members 100, 400. Also, the plated layers 120, 420 can be selectively formed or the plated layers 120, 420 can be patterned without using cumbersome production steps of the masking step and the etching step. This makes it possible for the production method according to a preferred embodiment of the present invention to be applied even to a case of producing a ceramic electronic component having numerous terminals in which a plurality of external electrodes serving as external conductor layers 12, 42 are formed on the outer surface of the ceramic element body chip 1.

Here, the portion on which the plated layers 120, 420 are formed may be the whole inside surface or a portion of the inside surface of the recess of the mold members 100, 400.

In the method of producing a laminated ceramic capacitor according to a preferred embodiment of the present invention, when the step of forming the plated layers on the inside surface of the recess of the mold members 100, 400 is carried out by non-electrolytic plating, and the portion of the mold members 100, 400 on which the plated layers 120, 420 are to be formed is made of a material that has a catalytic activity with respect to the reducing agent contained in the non-electrolytic plating bath, and the portion of the mold members 100, 400 on which the plated layers are not to be formed is made of a material that does not have a catalytic activity with respect to the reducing agent contained in the non-electrolytic plating bath, the plated layers 120, 420 can be easily formed selectively on only the portion made of the material having a catalytic activity in the inside surface of the recess of the mold members 100, 400 by non-electrolytic plating. Also, the plated layers 120, 420 can be selectively formed or the plated layers 120, 420 can be patterned without using the cumbersome production steps of the masking step and the etching step. This makes it possible for the production method according to a preferred embodiment of the present invention to be applied even to a case of producing a ceramic electronic component having numerous terminals in which a plurality of external electrodes serving as external conductor layers 12, 42 are formed on the outer surface of the ceramic element body chip 1.

Here, in this case also, the portion on which the plated layers 120, 420 are formed may be the whole inside surface or a portion of the inside surface of the recess of the mold members 100, 400.

Further, in the method of producing a laminated ceramic capacitor according to a preferred embodiment of the present invention described above, since the heat processing on the ceramic element body chip 1 is carried out at a temperature higher than the temperature at which the metal contained in the plated layers 120, 420 reacts with oxygen contained in the ceramic element body chip 1 to yield a product, firm close adhesion of the plated layers 120, 420 and the ceramic element body chip 1 with each other can be made by the presence of the product. By this process, the close adhesion property of the external conductor layers 12, 42 made of the plated layers to the ceramic element body chip 1 can be greatly improved.

Furthermore, by applying the production method according to a preferred embodiment of the present invention to the production of a laminated ceramic capacitor of chip type, a larger capacitance can be obtained with a smaller volume in a laminated ceramic capacitor.

FIG. 10 is a cross-sectional view illustrating a laminated ceramic capacitor obtained by the production method according to a preferred embodiment of the present invention.

As shown in FIG. 10, external conductor layers 12, 42 made of a plated layer are formed on the surfaces of both sides of the ceramic element body chip 1. The ceramic element body chip 1 includes a plurality of laminated ceramic layers and a plurality of internal conductor layers 11 arranged between the plurality of ceramic layers. The surface of a portion of the internal conductor layers 11 is exposed to the outside surface of the ceramic element body chip 1. Specifically, on the surfaces of both sides of the ceramic laminate body 10, end surfaces of the plurality of internal conductor layers 11 are alternately exposed. The external conductor layers 12, 42 made of a plated layer are formed so as to be electrically connected to the one end surface of the exposed internal conductor layers 11.

A case will be described in which a laminated ceramic capacitor which is one example of a plurality of ceramic electronic components by using the production method according to a preferred embodiment of the present invention is produced. In the plurality of laminated ceramic capacitors, external conductor layers 12, 42 made of a plated layer are formed on the surface of a portion of each of the plurality of ceramic element body chips 1. The plurality of ceramic element body chips 1 have upper and lower surfaces and right and left side surfaces connecting the upper and lower surfaces. Regarding the plurality of external conductor layers 12, 42, each of the external conductor layers 12, is arranged to extend from one end of the upper surface of each of the plurality of ceramic element body chips 1 to one end of the lower surface by passing through at least one of the left side surface and the right side surface. As shown in FIG. 10, the ratio of the standard deviation relative to an average value of the lengths S of the plurality of external conductor layers 12, 42 provided on the one end of either of the upper surface and the lower surface of each of the plurality of ceramic element body chips 1 is preferably about 3% or less, and more preferably about 1% or less, for example. The ratio of the standard deviation relative to an average value of the thicknesses T of the plurality of external conductor layers 12, 42 is preferably about 5% or less, and more preferably about 1% or less, for example.

In this manner, in the laminated ceramic capacitor produced by the production method according to a preferred embodiment of the present invention, the thickness of the plated layer constituting the external conductor layers 12, 42 and the length of both ends of the plated layer can be controlled.

Figure 11:
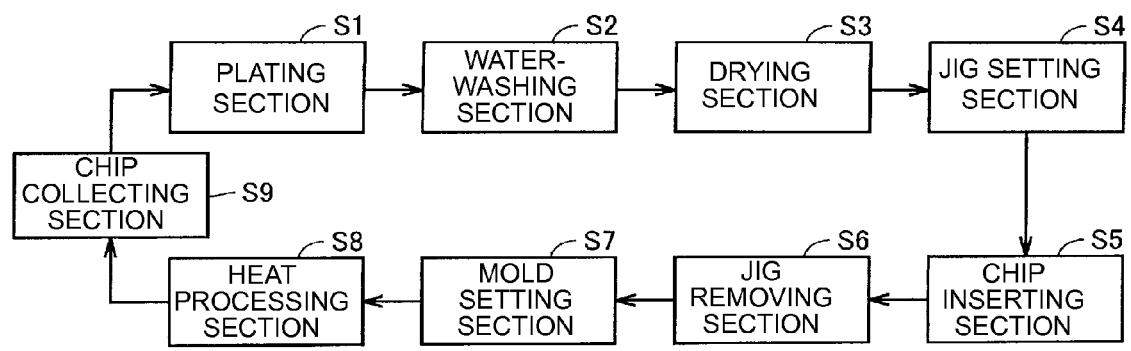
FIG. 11 is a block diagram showing a schematic construction of an apparatus for producing a laminated ceramic capacitor which is one example of a ceramic electronic component according to a preferred embodiment of the present invention.
Figure 12:
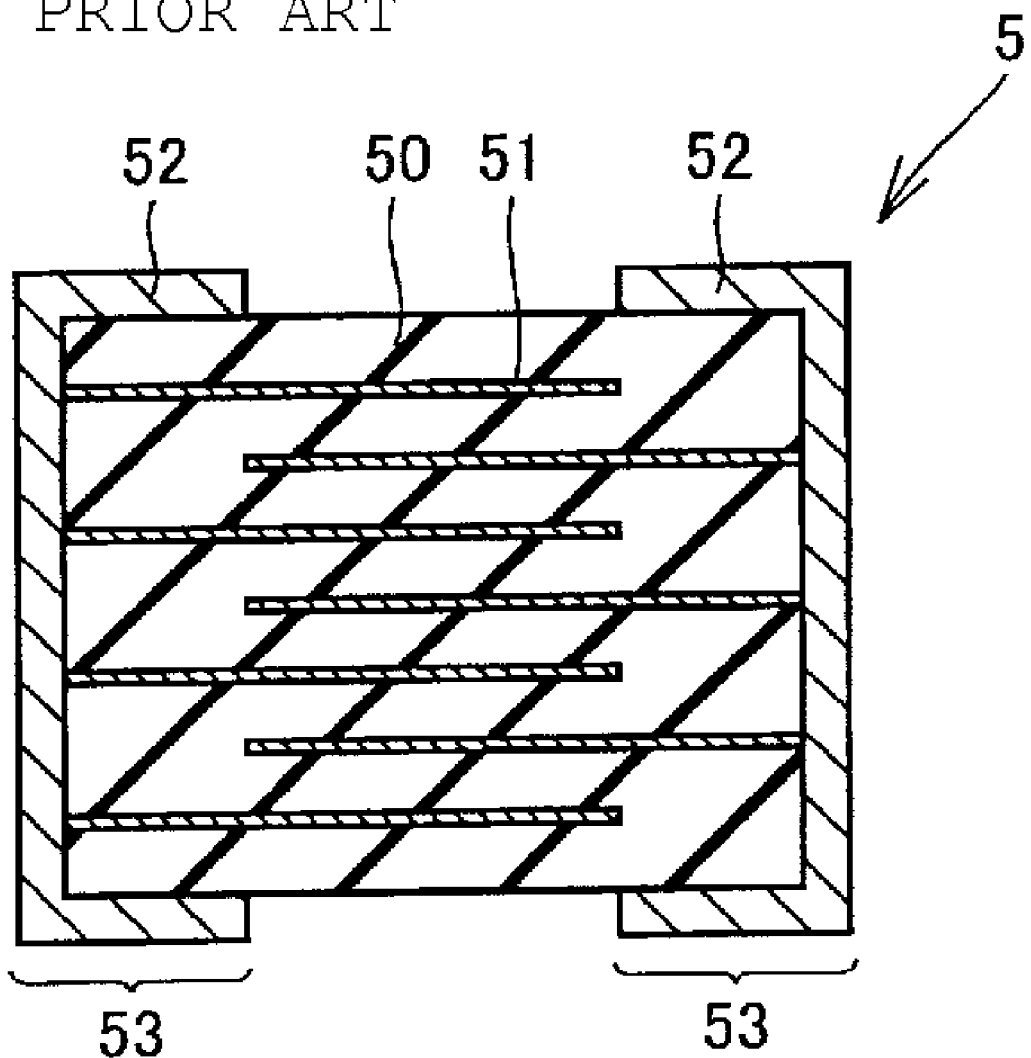
FIG. 12 is a cross-sectional view illustrating a conventional laminated ceramic capacitor.

FIG. 11 is a block diagram showing a schematic construction of an apparatus for producing a laminated ceramic capacitor which is one example of a ceramic electronic component according to a preferred embodiment of the present invention.

Referring to FIG. 11, in the apparatus for producing a laminated ceramic capacitor, as each station, a plating section S1, a water-washing section S2, a drying section S3, a jig setting section S4, a chip inserting section S5, a jig removing section S6, a mold setting section S7, a heat processing section S8, and a chip collecting section S9 are preferably successively disposed in a ring arrangement, for example.

The plating section S1 is a station in which a mold member 100 such as shown in FIG. 1 is prepared, and a plated layer 120 is formed on the inside surface of the recess of the mold member 100 as shown in FIG. 2. The water-washing section S2 is a station arranged to wash the mold member 100 with water after the plated layer 120 is formed. The drying section S3 is a station arranged to dry the water-washed mold member 100.

The jig setting section S4 is a station arranged to mount a ring-shaped chip guiding supporting jig 200 on the ceramic layer 110 so as to surround the recess, as shown in FIG. 3.

The chip inserting section S5 is a station in which one side portion of the ceramic element body chip 1 of the laminated ceramic capacitor is guided by the inner circumferential surface of the chip guiding supporting jig 200, and a portion of the ceramic element body chip 1 is inserted and fitted into the recess of the mold member 100, whereby the surface of the portion of the ceramic element body chip 1, that is, the surface on which the external conductor layer is to be formed, is brought into contact with the plated layer 120 formed on the inside surface of the recess of the mold member 100, as shown in FIG. 4.

The jig removing section S6 is a station arranged to remove the chip guiding supporting jig 200 from the mold member 100. The mold setting section S7 is a station in which the other side portion on the opposite side of the ceramic element body chip 1 of the laminated ceramic capacitor is inserted and fitted into the recess of the other mold member 400, whereby the surface of the other side portion serving as the surface of one portion of the ceramic element body chip 1 is brought into contact with the plated layer 420 formed on the inside surface of the recess of the mold member 400, as shown in FIG. 6.

The heat processing section S8 is a station in which the mold member 100 and the ceramic element body chip 1 are put into a heat processing furnace 500 to perform heat processing in a state in which the surface of both sides of the ceramic element body chip 1 is in contact with the plated layers 120, 420, as shown in FIG. 7.

The chip collecting section S9 is a station in which the ceramic element body chip 1 on which the external conductor layers 12, 42 have been formed is separated from the mold members 100, 400, as shown in FIG. 9.

The separated mold members 100, 400 are moved to the plating section S1 and repetitively put to use.

In this manner, in the method or apparatus for producing a laminated ceramic capacitor which is one example of a ceramic electronic component, a method or apparatus for producing an external conductor layer being excellent in mass productivity can be provided.

Hereafter, with use of the apparatus shown in FIG. 11, each of the production steps was carried out as shown in FIGS. 1 to 9. By the electrolytic plating method and the non-electrolytic plating method, external conductor layers 12, 42 made of a plated layer were formed on the surface of both sides of a ceramic element body chip 1 of a laminated ceramic capacitor as shown in FIG. 10.

An example of the ceramic element body chip 1 of the laminated ceramic capacitor had a prismatic shape with an approximate size of 1 mm×0.5 mm×0.5 mm, for example. External conductor layers 12, 42 were formed as two external electrode terminals on the laminated ceramic capacitor. The major component of the ceramic laminate body 10 was $BaTiO_3$, and the thickness of each ceramic layer constituting the ceramic laminate body 10 was about 2 μm, for example. The major component of the internal conductor layer 11 serving as an internal electrode was Ni, and the thickness of each internal conductor layer 11 was about 1 μm, for example.

In the case of forming a plated layer constituting the external conductor layers 12, 42 by the electrolytic plating method, the condition for forming the plated layer 120 on the inner wall surface of the recess of the mold member 100 was as follows, as shown in FIG. 2. The electrolytic plating bath was a pyrophosphoric acid series electrolytic Cu plating bath with a pH value of 8.6, a bath temperature of 58° C., a pyrophosphoric acid concentration of 238 g/L, and a copper ion concentration of 34 g/L, for example. As the barrel plating condition, a horizontal barrel of 300 mL was used with a rotation number of 20 rpm; the volume of the solder balls having a diameter of 0.7 mm was set to be 70 mL; the chip volume was set to be 30 mL, and the energization condition was set to be an electric current of 10 A for 180 minutes; and the target value of the plated film thickness was set to be 5 μm, for example.

In the case of forming a plated layer constituting the external conductor layers 12, 42 by the non-electrolytic plating method, the condition for forming the plated layer 120 on the inner wall surface of the recess of the mold member 100 was as follows, as shown in FIG. 2. The composition of the non-electrolytic plating bath was such that copper sulfate was 0.04 mol/L, formaldehyde as a reducing agent was 0.16 mol/L, oxalic acid was 0.1 mol/L, polyethylene glycol was 1.0 g/L, and sodium hydroxide was 0.125 mol/L, for example.

The thickness of the plated layer 120 formed on the inner wall surface of the recess of the mold member 100 by the electrolytic plating method or the non-electrolytic plating method in the plating section S1 of FIG. 11 was about 5 μm, for example. In the drying section S3, the water-washed mold member 100 was dried at a temperature of 300° C. for 3 minutes, for example.

Also, in the heat processing section S8 of FIG. 11, the heat processing step shown in FIG. 7 was carried out by holding the ceramic element body chip 1 and the mold members 100, 400 for 10 seconds in the inside of a heat processing furnace having a temperature of 1700° C. and an oxygen concentration of 50 ppm, for example.

In the above-described manner, as shown in FIG. 10, a plurality of ceramic element body chips 1 of a laminated ceramic capacitor on which the external conductor layers 12, 42 made of a plated layer had been formed were fabricated.

With respect to the obtained numerous ceramic element body chips 1, the length S of the wrap-around ends of the external conductor layers 12, 42 and the thickness of the external conductor layers 12, 42 were measured at arbitrary 50 points. As a result thereof, whether the external conductor layers 12, 42 were formed with an electrolytically plated layer or a non-electrolytically plated layer, the ratio of the standard deviation relative to the average value or the target value of about 0.1 mm of the length S was about 0.9%, and the ratio of the standard deviation relative to the average value or the target value of about 5 μm of the thickness T was about 0.8%, which were less than about 1%. From this, it will be understood that, in the laminated ceramic capacitor produced by the production method according to a preferred embodiment of the present invention, the thickness of the plated layer constituting the external conductor layers 12, 42 and the length of both ends of the plated layer could be controlled.

It is to be considered that the preferred embodiments and Examples disclosed herein are in all respects exemplary and not limitative. It is intended that the scope of the present invention is shown not by the above-described preferred embodiments or Examples but by the appended claims, and includes all modifications and changes that are equivalent to and comprised within the scope of the claims.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. A plurality of ceramic electronic components in which a plated layer is formed on a surface of a portion of each of a plurality of ceramic element bodies, comprising:
    a plurality of ceramic element bodies having upper and lower surfaces and left and right side surfaces connecting the upper and lower surfaces; and
    a plurality of plated layers in which each of the plated layers is arranged to extend from one end of the upper surface of each of said plurality of ceramic element bodies to one end of the lower surface by passing through at least one of the left side surface and the right side surface; wherein
    each of the plurality of plated layers includes a first portion that is disposed on the one end of the upper surface of each of said plurality of ceramic element bodies and a second portion that is disposed on the one end of the lower surface of each of said plurality of ceramic element bodies;
    a ratio of a standard deviation relative to an average value of lengths of the first and second portions of said plurality of plated layers disposed on the one end of the upper surface and the lower surface of each of said plurality of ceramic element bodies is about 3% or less.

2. The plurality of ceramic electronic components according to claim 1, wherein a ratio of a standard deviation relative to an average value of thicknesses of said plurality of plated layers is about 5% or less.

* * * * *